US008726511B2

(12) United States Patent
Schulte

(10) Patent No.: US 8,726,511 B2

(45) Date of Patent: May 20, 2014

(54) METHOD FOR PRODUCTION OF PANELS

(76) Inventor: Johannes Schulte, Rüthen-Meiste (DE)

( * ) Notice: Subject to any disclaimer, the term of this patent is extended or adjusted under 35 U.S.C. 154(b) by 1409 days.

(21) Appl. No.: 12/063,708

(22) PCT Filed: Aug. 1, 2006

(86) PCT No.: PCT/EP2006/007604

§ 371 (c)(1),
(2), (4) Date: Feb. 13, 2008

(87) PCT Pub. No.: WO2007/019957

PCT Pub. Date: Feb. 22, 2007

(65) Prior Publication Data

US 2010/0170189 A1 Jul. 8, 2010

(30) Foreign Application Priority Data

Aug. 16, 2005 (DE) ......................... 10 2005 038 975
Oct. 17, 2005 (EP) ..................................... 05022574

(51) Int. Cl.
*B23P 17/00* (2006.01)

(52) U.S. Cl.
USPC ....................................................... 29/897.32

(58) Field of Classification Search
USPC .......................... 29/897.32; 52/745.19, 592.1
See application file for complete search history.

(56) References Cited

U.S. PATENT DOCUMENTS

2005/0160694 A1 7/2005 Pervan

FOREIGN PATENT DOCUMENTS

| | | |
|---|---|---|
| DE | 39 08 851 | 9/1990 |
| DE | 199 63 203 | 9/2001 |
| EP | 1 048 423 A2 | 11/2000 |
| WO | WO 2004/074597 | 9/2004 |
| WO | WO 2005/060507 | 7/2005 |

*Primary Examiner* — David Bryant
*Assistant Examiner* — Moshe Wilensky
(74) *Attorney, Agent, or Firm* — Henry M. Feiereisen LLC

(57) ABSTRACT

The invention relates to a method for production of panels for floor, wall or ceiling coverings, with the panels being cut from a large starting sheet and provided on their long sides (11, 12) with locking strips (15, 16). The starting sheet is hereby provided with parallel grooves (4, 5) along the topside and underside thereof, with the upper groove (4) and the lower groove (5) extending in the sheet plane (PE) at an offset in relation to one another at a distance (a), thereby forming a breaking web (6). The starting sheet (1) is then divided along the breaking web (6) such that projecting longitudinal strips remain along the long sides (11, 12) and are used for shaping the locking strips (15, 16).

11 Claims, 5 Drawing Sheets

METHOD FOR PRODUCTION OF PANELS

BACKGROUND OF THE INVENTION

The invention relates to a method for production of panels for floors, wall or ceiling coverings.

Heretofore, coverings in the form of panels with various surface coatings as well as different décor and geometric configuration are oftentimes used as floor covering as well as wall or ceiling paneling.

Laminate floorings are widely used for example. A laminate floor panel includes a panel sheet of fiber material, mostly of highly compacted fiber board or fiber board of average compaction, with a decorative paper impregnated with resin being applied on its topside. The decorative paper is determinative for the look of the panel. The so-called overlay or the sealing forms a useful layer made of varnish and impregnated with special resin to thereby impart the floor panels the ability to withstand great surface strain. Applied to the underside of the panel sheet is a so-called counteracting layer which provides stable shape and a moisture barrier. Optionally, an impact sound insulation may further be provided on the underside.

The production of laminate floor panels as well as of panels for wall or ceiling paneling is realized by way of a continuous run-through process which applies on a large starting sheet of highly compacted fiber material or fiber material of average compaction the multiply layer structure with decorative paper, sealing as well as counteracting layer. Subsequently, the sheet is subdivided into panels. Thereafter, the edges of the panels are profiled to establish locking strips on their long sides and end sides. The locking strips are predominantly configured as groove and tongue on the confronting marginal sides of a panel. When the covering has been installed, the locking strips of neighboring panels engage one another.

Cutting the panels to size from the large starting sheet is implemented by a sawing cut. Thereafter, the edges are finished and profiled, as mentioned, to form the locking strips. The saw cut and the profiling works cause necessarily loss of material. Therefore, it is desired to streamline and optimize the production process.

SUMMARY OF THE INVENTION

The invention is based on the object to provide a more efficient method of making panels, which saves material and is cost-efficient.

This object is solved according to the invention by a method for production of panels for floors, wall or ceiling coverings, with the panels being cut to size from a large starting sheet and provided with locking strips on their long sides, wherein the starting sheet is provided on its topside and on its underside with parallel grooves, with the upper groove and the lower groove extending at offset relationship in the sheet plane and with the starting sheet being divided so that projecting longitudinal strips remain along the long sides which are used for formation of the locking strips.

An essential feature of the invention is the measure to provide the starting sheet on its topside with an upper groove and on its underside with at least one lower groove, with the upper groove and the lower groove extending in parallel offset relationship. The starting sheet is then divided. As a result of the cut pattern of the groove, projecting longitudinal strips remain along the long sides and can be used for formation of the locking strips.

As the partition is implemented in a manner that the required cuts in the form of grooves are carried out in the regions which are trimmed when shaping the locking strips, waste caused by cutting is minimized when dividing the starting sheet. The need for a continuous saw cut is eliminated in accordance with the invention. As a consequence, the otherwise typical material loss, which is commensurate to at least the width of saw blade, can be omitted during each dividing step in length direction of the starting sheet. Overall, the process according to the invention results in a better utilization of the starting sheet by up to 8% depending on the panel width and profile of the locking strips.

The offset between the upper groove and the lower groove may basically correspond to the width of a saw blade so that the grooves meet on confronting cut edges, i.e. virtually run into one another. Longitudinal strips are then formed on the long sides of the panel boards in correspondence to the thickness of a saw blade.

According to a particularly advantageous configuration of the basic inventive idea, the upper groove and the lower groove are arranged offset to one another by a distance so as to establish a breaking web between the grooves, and the starting sheet is then divided along the breaking web. Preferably, the partition is carried out in horizontal direction parallel to the fiber material of the starting sheet.

As the individual panel portions are connected by the breaking webs even after providing the grooves, it is possible to transport the starting sheet as a whole and to transfer it to the shaping tool. This is beneficial as far as manufacture is concerned. The starting sheet is divided into individual panels only during or before shaping the longitudinal strips on the long sides.

Basically, different starting sheets with finished surface coat can be used. Known laminates or parquet as well as starting sheets with a surface coat of linoleum, cork, or a direct varnish as well as with a surface of a textile coating may be worked on with the method according to the invention in order to make panels for floor, wall or ceiling coverings.

In particular when starting sheets with a so-called aggressive surface are involved, i.e. a highly wear-resistant or nonabrasive coating, it may be suitable to trim areas of the surface in the region of the upper groove to be made beforehand. This is realized with a milling tool. The milling tool produces a broached groove and broaches the running surface of the starting sheet. The width of the broached groove is hereby sized to almost reach the respectively finished edge of the panels to be manufactured. The upper groove is then produced in the previously made broached groove. In this way, the milling or cutting tools used for producing the upper groove can reach a significantly longer service life as they have to work only on comparably softer material, for example MDF. This measure also positively affects the precision of the groove being produced. The upper groove may be so configured as to be guided in front of the end face of the later locking strip to be produced in a shaping operation, for example a tongue.

Within the scope of a further advantageous embodiment of the invention, a $1^{st}$ lower groove and a $2^{nd}$ lower groove is made on the underside of the starting sheet. This is realized at a horizontal distance to one another. The arrangement and configuration of the $1^{st}$ lower groove and the $2^{nd}$ lower groove is implemented in dependence on the shape of the longitudinal strips during the following operation. Basically, the $1^{st}$ lower groove and the $2^{nd}$ lower groove may be cut in a run-through process in parallel or staggered in time. The introduction of the $1^{st}$ lower groove and the $2^{nd}$ lower groove may be realized before or after partition of the panels. In reality, it is contemplated to first provide the upper groove and the $1^{st}$ lower groove in the starting sheet, then to divide it, and subsequently to provide the $2^{nd}$ lower groove before the shaping operation of the longitudinal strips. The inner $2^{nd}$ lower groove serves in particular as guide groove for a shaping tool by which the longitudinal strips are worked on and the locking strips are produced. Primarily, the use of a so-called double-end profiler is here considered for use.

The $1^{st}$ lower groove and the $2^{nd}$ lower groove may be cut at different depth. This is undertaken in dependence on the shaping operation to be executed and the shape of the locking strips to be produced.

According to the another feature of the invention, the grooves have each a slanted groove base. It is advantageous for the partition procedure when the groove base of the upper groove and the groove base of the lower groove are slanted in the same direction. When the starting sheet is broken along the breaking web, a kind of desired breaking line is realized in the direction of the slants in the groove base.

According to another feature of the invention, the depth of one groove should correspond to a value which is 0.3 times to 0.6 times the thickness of a starting sheet. In practical tests, the upper and the lower grooves have been slitted by about half the thickness of the starting sheet and subsequently divided. This resulted in very good outcomes. The upper groove and the lower groove may also have different length. Placement and the depth of the grooves are implemented in dependence on the configuration of the locking strips to be produced.

The horizontal distance between the upper groove and the lower groove is dimensioned by a value which is between 0.5 times to 3 times the width of a groove. The distance between the grooves is dimensioned in dependence on the profile to be realized of the locking strips so as to attain a reliable partition along the breaking web.

BRIEF DESCRIPTION OF THE DRAWING

The invention will now be described with reference to the drawings. It is shown in.

DETAILED DESCRIPTION OF PREFERRED EMBODIMENTS

Figure 1A:
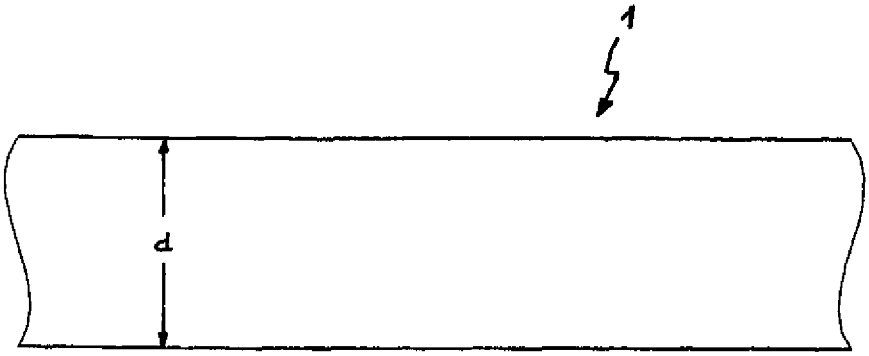
FIGS. 1*a* to 1*c* a schematic representation of three different process steps involved in the operation for dividing a starting sheet.

FIG. 1*a* shows a portion of a large starting sheet 1. The starting sheet 1 is made of a highly-compacted fiber material or fiber material of average compaction. Already applied onto the starting sheet 1 is the typical overlay and optionally also the counteracting layer. The starting sheet 1 is then divided in a run-through process first in length direction and then in transverse direction to there produce individual panels.

Figure 1B:
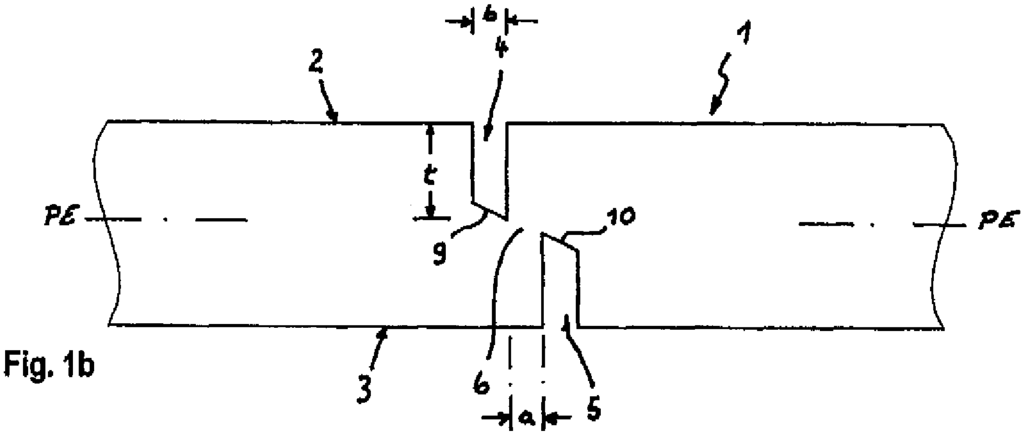
Figure 1C:
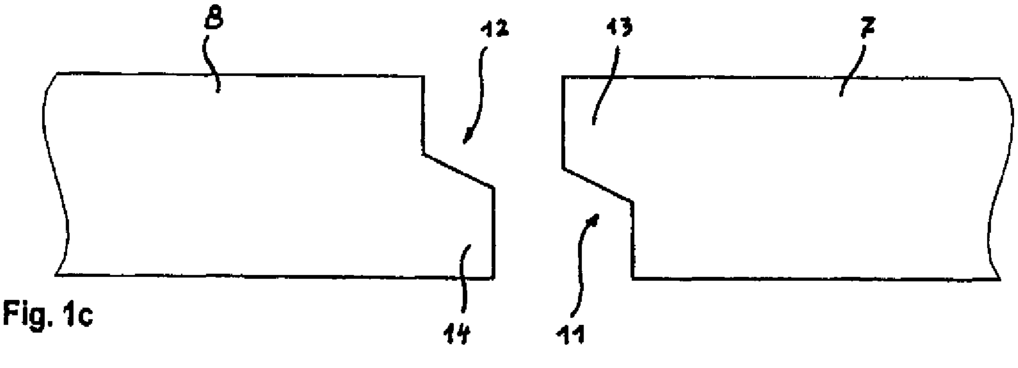

Dividing the starting sheet 1 in longitudinal direction involves, as shown in FIG. 1*b*, the provision of parallel grooves 4, 5 in the topside 2 and underside 3 of the starting sheet 1, as viewed in the drawing plane. The upper groove 4 and the lower groove 5 are arranged at offset relationship at a distance a in the horizontal sheet plane PE so as to leave a breaking web 6 between the grooves 4, 5. Thereafter, the starting sheet 1 is split and divided along the breaking web 6, as shown in FIG. 1*c*. The emerging panels or panel boards are designated with 7 and 8.

It can be seen that the grooves 4, 5 have each a slanted groove base 9, 10, with the groove base 9 of the upper groove 4 and the groove base 10 of the lower groove 5 being slanted in the same direction. The depth t of the groove 4, 5 corresponds to about half the thickness d of the starting sheet 1. The distance a between the upper groove 4 and the lower groove 5 corresponds to the width b of a groove 4, 5.

Figure 2:
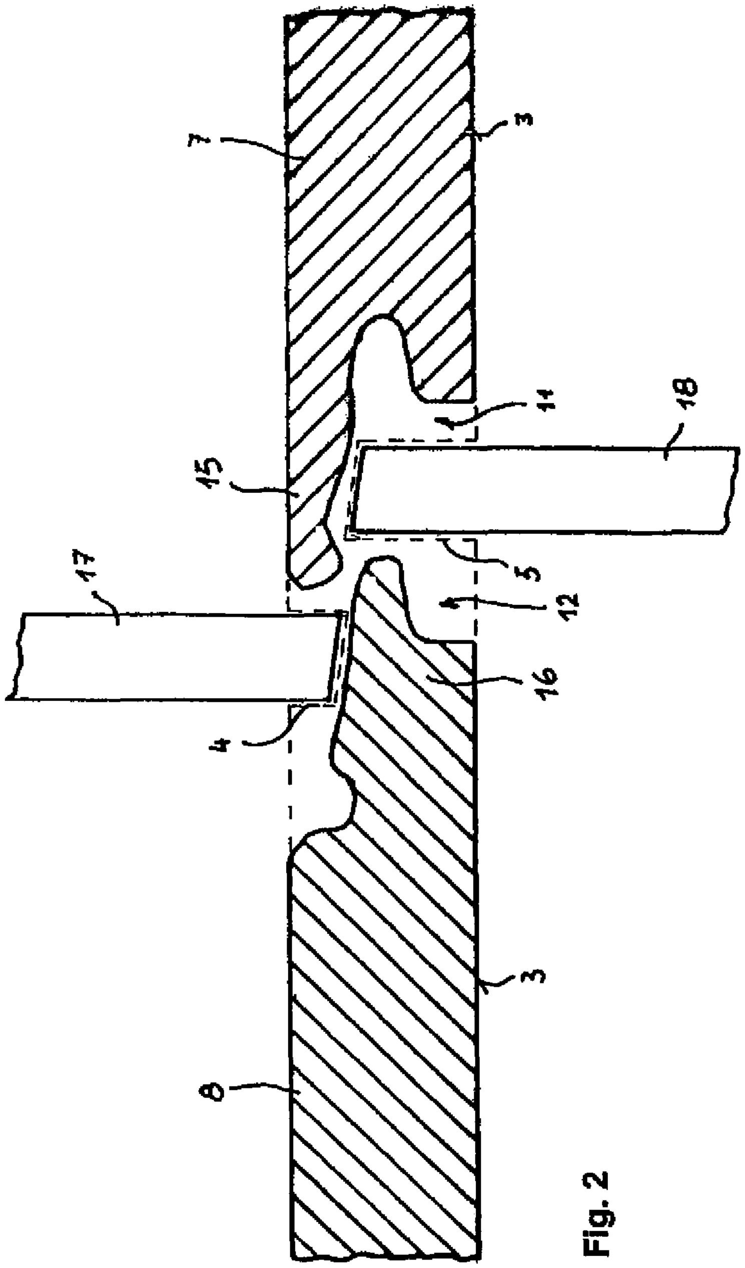
FIG. 2 a vertical section of two adjacent panels with illustration of a portion of the long sides.

In view of the offset cutting pattern of the grooves 4, 5, projecting longitudinal strips 13, 14 remain on the panels or panel boards 7, 8 along the long sides 11, 12 once the starting sheet 1 has been divided. The long sides 11, 12 are profiled in a following processing step and locking strips 15, 16 are carved out from the material using the long sides 13, 14, as shown in FIG. 2. The contours of the locking strips 15, 16 on the confronting long sides 11, 12 complement one another and engage one another when making a covering of neighboring panels.

FIG. 2 shows the profile of a panel or panel board 7 and 8 shaded on their long sides 11, 12. The area shown in dashed lines between the panels 7, 8 has been trimmed during shaping of the locking strips 15, 16 after the starting sheet 1 has been divided.

Further shown are an upper saw blade 17 and a lower saw blade 18 for making the upper groove 4 and the lower groove 5, respectively. The upper groove 4 and the lower groove 5 extend parallel and in horizontal sheet plane PE at distance a relative to one another. It can be seen that the grooves 4, 5 are introduced in the area of the starting sheet 1 that has not been shaded, i.e. in an area which is trimmed during production of the locking strips 15, 16. In this way, material can be saved because of the absence of a continuous saw cut which would involve a partition of the starting sheet 1 across its entire thickness d.

It should further be noted that the underside of the panel boards, designated with 3 in FIG. 2 analogous to FIG. 1*b*, forms the facing or topside of a finished panel 7 and 8, respectively.

Figure 3:
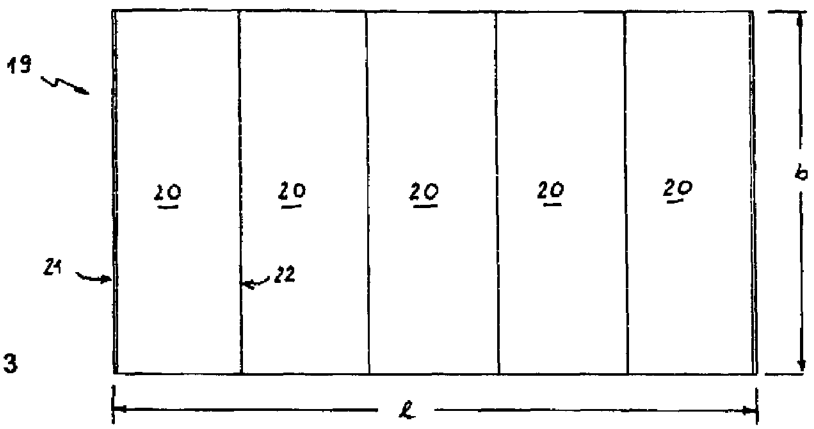
FIG. 3 the top view of a starting sheet.

FIG. 3 shows a starting sheet 19 with finished coat and with a length l of 2,100 mm and a width b of 1,300 mm. The starting sheet 1 is divided in longitudinal direction into a total of five panels 20 which are profiled along their long sides 21, 22 and provided with locking strips 23, 24, as is illustrated with reference to FIGS. 4*a* to 4*e*.

The topside 25 of the starting sheet 19 is first provided with broached grooves 27 in a run-through process with the aid of milling tools 26. The hard topside 25 of the starting sheet 19 is hereby trimmed in the area of the broached grooves 27. When viewed together with FIG. 7*a*, it becomes clear that the topside 25 is broached in the area of a broached groove 27 almost up to the finished edge 28 of a finished panel 20.

Subsequently, the topside 25 of the starting sheet 19 is provided with an upper groove 29 and its underside 30 is provided with a lower groove 31. The upper groove 29 is hereby established in the previously produced broached groove 27. This takes place in the run-through process by means of diamond saw blades 32, 33.

Figure 4A:
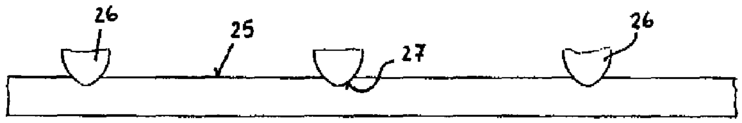
FIGS. 4*a* to 4*e* various working steps showing the process for manufacture of panels from a starting sheet.
Figure 4B:
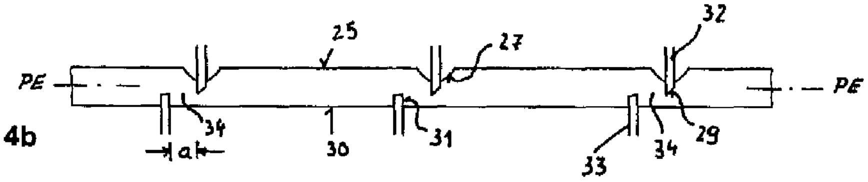
Figure 4C:
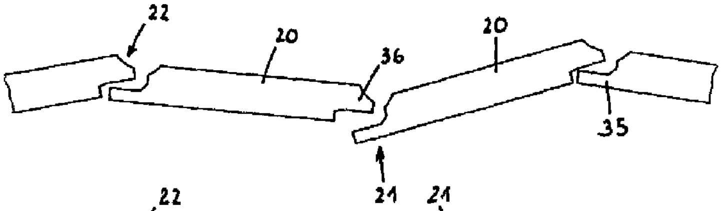
Figure 4D:
Figure 4E:
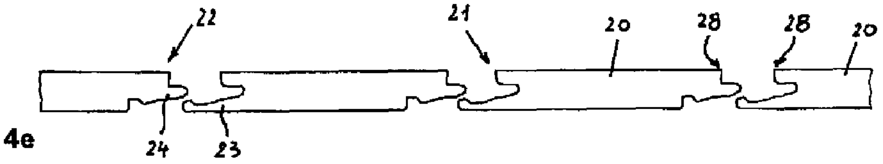

It can be seen that the upper groove 29 and the lower groove 30 extend parallel and in the horizontal sheet plane PE at distance a in relation to one another. Breaking webs 34 remain between the grooves 29, 30, respectively, so that the starting sheet 19 remains still connected initially and thus can be transported as a unit. The starting sheet 19 is then transferred to a shaping station in which the long sides 21, 22 of the panels 20 are shaped and the locking strips 23, 24 are produced. The starting sheet 19 is hereby divided along the respective breaking webs 34 which define a desired breaking area, as shown in FIGS. 4*c* and 4*d*. It can be seen that the longitudinal strips 35, 36 remain along the long sides 21, 22 and are worked on by means of a shaping tool so that the locking strips 23, 24 are produced, using the material of the longitudinal strips 35, 36, as can be seen in FIG. 4*e*.

Also in the process for the production of panels, as described with reference to FIGS. 5*a* to 5*e* and FIG. 6, the topside 37 of a starting sheet 38 is first provided with a broached groove 39 and areas of the topside 37 are trimmed. An upper groove 40 is provided within the broached groove 39. Parallel thereto, a $1^{st}$t lower groove 42 is produced on the underside 41 of the starting sheet 38.

Figure 5A:
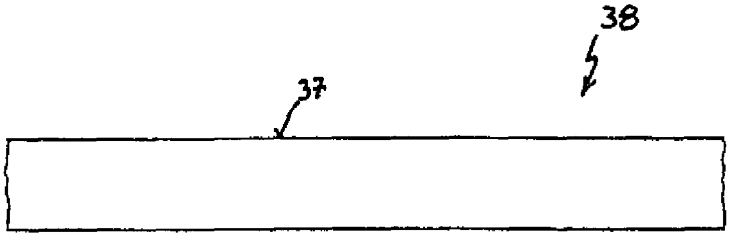
FIGS. 5*a* to 5*g* a further exemplary embodiment of the method according to the invention.
Figure 5B:
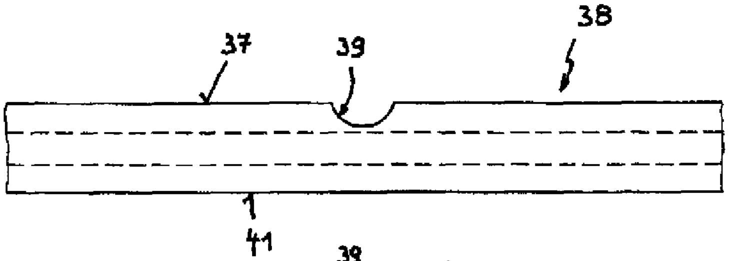
Figure 5C:
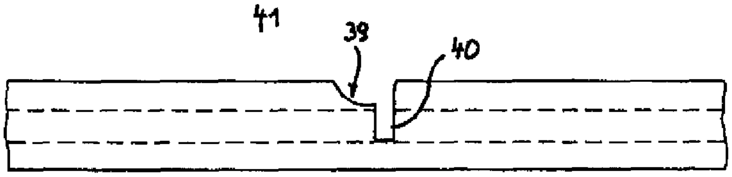
Figure 5D:
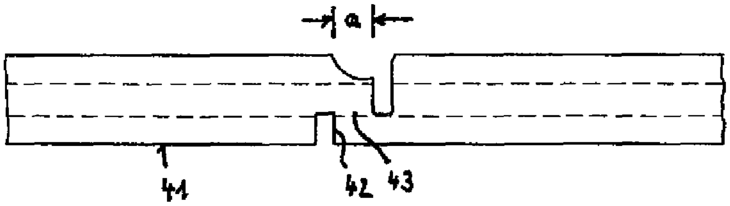
Figure 5E:
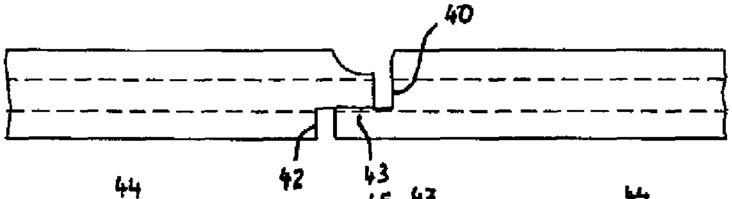
Figure 5F:
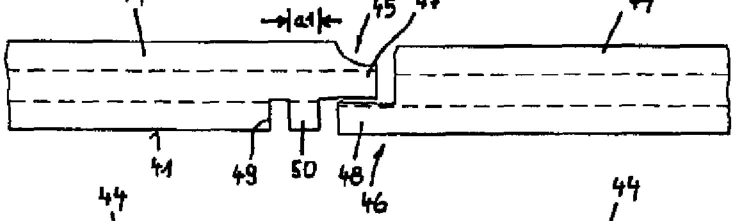
Figure 5G:
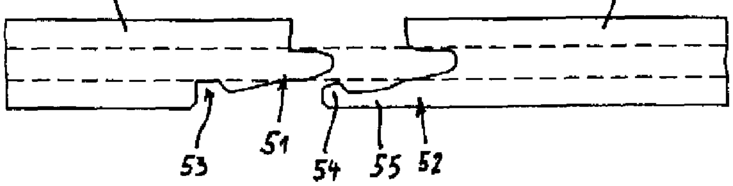

The upper groove 40 and the $1^{st}$ lower groove 42 extend at a distance a in relation to one another and are still connected in this process state according to FIG. 5*d* by a breaking web 43. In the next step (FIG. 5*e*), the starting sheet 38 is divided along the breaking webs 43 so that individual panels 44 are created that have long sides 45, 46 with projecting longitudinal strips 47, 48.

Before the longitudinal strip 47 of a panel 44 is shaped, the underside 41 of the panel is provided with a $2^{nd}$ lower groove 49. The $2^{nd}$ lower groove 49 extends at a horizontal distance a1 to the $1^{st}$ lower groove 42 so that a vertical web 50 is realized between $1^{st}$ lower groove 42 and $2^{nd}$ lower groove 49. The $1^{st}$ lower groove 42 is slightly cut deeper than the $2^{nd}$ lower groove 49.

The longitudinal strips 47 and 48 are then shaped so as to form locking strips 51, 52 on the long sides 45, 46 of the panels 44.

The $2^{nd}$ lower groove 49 forms a guide groove for a shaping tool, a so-called double-end profiler, during the shaping process. In addition, the $2^{nd}$ lower groove 49 is used to produce an undercut on the locking strip 51 to form a locking recess 53 for a terminal locking web 54 on the corresponding bottom-side latching tab 55 of the locking strip 52.

The dashed lines shown in FIGS. 5*b* to 5*g* are intended as aid to illustrate the position or configuration of the longitudinal strips 47, 48 in relation to the later locking strips 51, 52.

Figure 6:
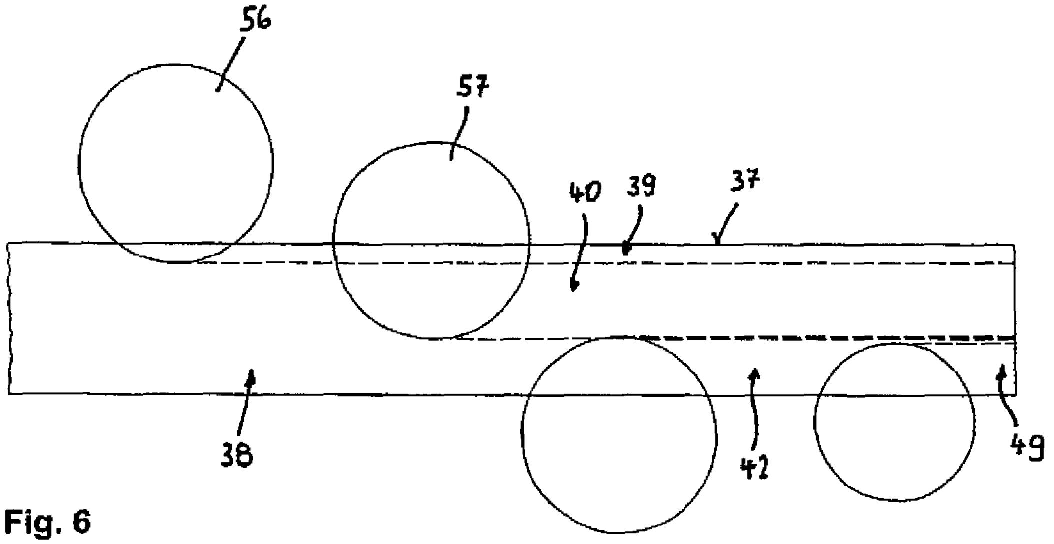
FIG. 6 a side view of a starting sheet during production of the upper and lower grooves.

FIGS. 6 as well as 7*a* and 7*b* show an overview of the position of the milling and sawing tools in relation to the locking strips 51, 52 formed on the finished panels 44.

The travel direction of the starting sheet 38 through the processing station for producing the broached groove 39 as well as the upper groove 40 and the lower grooves 42, 49 is labeled by the arrow LR in FIG. 6.

Figure 7A:
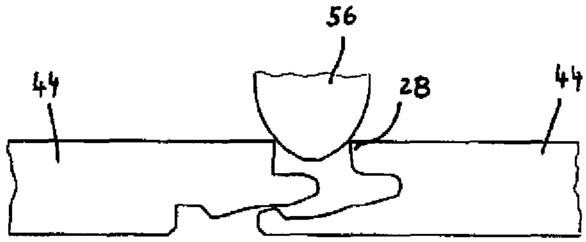
FIGS. 7*a* and 7*b* a summarizing illustration of the procedure during production of the grooves.

Looking at FIG. 7*a* and FIG. 5*b*, it becomes clear that during production of the broached groove 39 the topside 37 of the starting sheet 38 is broached by means of the milling tool 56 almost up to the finished edge 28 of the panel 44. The upper groove 40 is produced in the broached groove 39 by means of the upper saw blade 57, with the saw blade 57 cutting hereby directly in front of the end surface 58 of the tongue 59 to be realized later on the locking strip 51. The underside 41 of the starting sheet 38 is worked on by both saw blades 60 and 61 for producing the $1^{st}$ lower groove 42 and the $2^{nd}$ lower groove 49.

Figure 7B:
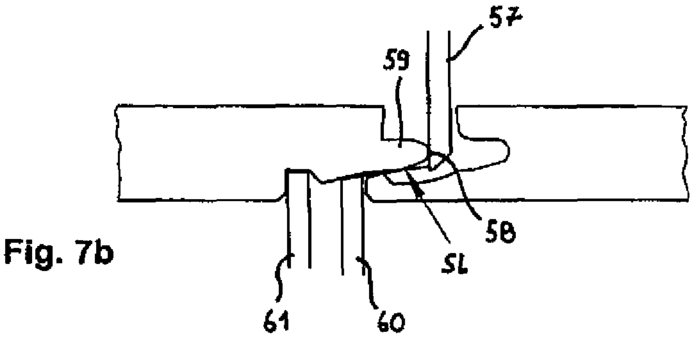

Further shown in FIG. 7*b* is the imaginary desired breaking line, labeled with SL and extending along the breaking web 43 which is formed between the upper groove 40 and the $1^{st}$ lower groove 42, as shown in FIG. 5*c*.

What is claimed is:

1. A method for production of panels for floors, wall or ceiling coverings, comprising the steps of:

forming a first groove in a topside of a starting sheet by providing a pilot groove on the topside of the starting sheet, and broaching the pilot groove for producing the first groove;

forming a second groove in an underside of the starting sheet, with the first and second grooves extending in offset parallel relationship at a distance to one another in a plane of the starting sheet, thereby forming a breaking web which maintains the integrity of the starting sheet after the first and second grooves have been formed; and dividing the starting sheet along the breaking web, thereby forming neighboring panels having projecting longitudinal strips along long sides of the neighboring panels.

2. The method of claim 1, wherein the first and second grooves have a depth which is 0.4-0.6 times a thickness of the starting sheet.

3. The method of claim 1, further comprising the step of transferring the starting sheet for further processing after formation of the first and second grooves and before the dividing step.

4. A method for production of panels for floors, wall or ceiling coverings, comprising the steps of:

forming a first groove in a topside of a starting sheet;

forming a second groove in an underside of the starting sheet, with the first and second grooves extending in offset parallel relationship at a distance to one another in a plane of the starting sheet, thereby forming a breaking web which maintains the integrity of the starting sheet after the first and second grooves have been formed;

dividing the starting sheet along the breaking web, thereby forming neighboring panels having projecting longitudinal strips along long sides of the neighboring panels; and forming a third groove in the underside of the starting sheet at horizontal distance to the second groove.

5. The method of claim 4, wherein the second and third grooves in the underside of the starting sheet have different depths.

6. The method of claim 4, wherein the first groove and the third groove are each defined by a same width and are spaced from one another by a horizontal distance which is between 0.5-3 times the width.

7. The method of claim 4, wherein the first and second grooves have a depth which is 0.4-0.6 times a thickness of the starting sheet.

8. The method of claim 4, further comprising the step of transferring the starting sheet for further processing after formation of the first and second grooves and before the dividing step.

9. The method of claim 8, wherein the first and second grooves have a depth which is 0.4-0.6 times a thickness of the starting sheet.

10. The method of claim 4, further comprising the step of transferring the starting sheet for further processing after formation of the first and second grooves and before the dividing step.

11. A method for production of panels for floors, wall or ceiling coverings, comprising the steps of:

forming a first groove in a topside of a starting sheet;

forming a second groove in an underside of the starting sheet, with the first and second grooves extending in offset parallel relationship at a distance to one another in a plane of the starting sheet, thereby forming a breaking web which maintains the integrity of the starting sheet after the first and second grooves have been formed, and with the first and second grooves having each a slanted groove base, wherein the groove base of the first groove and the groove base of the second groove are slanted in a same direction; and dividing the starting sheet along the breaking web, thereby forming neighboring panels having projecting longitudinal strips along long sides of the neighboring panels.

* * * * *